United States Patent Office 3,495,941
Patented Feb. 17, 1970

3,495,941
CATALYTIC PROCESS FOR REDUCTION OF
SULFUR DIOXIDE
Henricus J. A. Van Helden, Amsterdam, Netherlands, assignor to Shell Oil Company, New York, N.Y., a corporation of Delaware
No Drawing. Filed Feb. 16, 1968, Ser. No. 705,889
Claims priority, application Great Britain, Mar. 2, 1967, 9,982/67
Int. Cl. C01b 17/04, 17/16
U.S. Cl. 23—226  8 Claims

ABSTRACT OF THE DISCLOSURE

A process for the reduction of sulfur dioxide to hydrogen sulfide by contacting a gaseous mixture containing sulfur dioxide with a reducing gas in the presence of a catalyst containing a vanadium oxide supported on a carrier. In a specific embodiment elemental sulfur is produced by contacting a portion of the sulfur dioxide gas with a second portion which has been treated to reduce the sulfur dioxide to hydrogen sulfide by contact with a reducing gas and a vanadium oxide catalyst.

BACKGROUND OF THE INVENTION

Field of the invention

This invention relates to a process for the reduction of sulfur dioxide to hydrogen sulfide.

Description of the prior art

Sulfur dioxide, a gas which is handled on a large scale in industrial processes, is in many cases a useful compound; thus, for instance, when it is formed by roasting ores and used as a starting material for the production of valuable chemical products, such as sulfuric acid.

In other cases, sulfur dioxide is only a waste product, present in flue gases formed by the combustion of sulfur-containing fuels. The consumption of sulfur-containing fuels has increased greatly in recent years due to the increasing industrialization. As a result, air pollution by sulfur oxides has become a problem of increasing importance. Many investigations of processes for the removal of sulfur dioxide from flue gases have been carried on. In one such process, sulfur dioxide is removed by accepting it on a solid acceptor which contains a metal or a metal compound. During the acceptance step sulfur dioxide forms a metal sulfate with the metal or metal compound in the acceptor and the oxygen present in the flue gas. The sulfate is subsequently decomposed in a regeneration step by means of a reducing gas, thereby producing an off gas considerably richer in sulfur dioxide than the original flue gas. This sulfur-dioxide-rich gas is useful as a starting material for the production of elemental sulfur, as explained below.

An example of a suitable solid acceptor is a copper-oxide-containing acceptor disclosed in French Patent No. 1,448,396. The acceptance of sulfur dioxide is carried out at a temperature of from 325 to 425° C. The copper sulfate formed during acceptance is decomposed in the regeneration step by means of an excess of a reducing gas. This regeneration is carried out at the same or slightly different temperature as the acceptance reaction. The regeneration of a loaded acceptor produces a gas which consists mainly of sulfur dioxide and unconverted reducing gas, for instance methane. This gas may be used for the production of elemental sulfur, for instance, by reacting it with a hydrogen-sulfide-containing gas at temperatures in the range of 350°–450° C. It is therefore advantageous if a hydrogen-sulfide-containing gas can be prepared by reducing sulfur dioxide available in a gas at temperatures in the desired range of 350–450° C.

The catalytic reduction of sulfur dioxide to hydrogen sulfide is a known process. With methane the reduction proceeds according to the following equation:

$$4SO_2 + 3CH_4 \rightarrow 4H_2S + 3CO_2 + 2H_2O$$

A known reduction catalyst is manganese sulfide and the reaction between sulfur dioxide and the hydrocarbons over this catalyst proceeds satisfactorily at temperatures higher than 700° C.

Cobalt molybdate is another catalyst disclosed for the reduction of sulfur dioxide with methane. This catalyst, too, requires high temperatures for the reduction, and is preferably used at temperatures between 593 and 705° C. Moreover, the reduction is preferably carried out at a low space velocity of 50–500 volumes of feed per volume of catalyst per hour.

The present invention has as an object providing a process which has the advantages that it may be carried out at a relatively low temperature and at high space velocity. Another object is to provide a process for the production of elemental sulfur. Still another object is to provide a combined process for the removal of sulfur dioxide from flue gases by means of a solid acceptor, regenerating the loaded acceptor with a reducing gas and processing the sulfur dioxide formed in this regeneration to elemental sulfur. A further object is to provide a catalyst for the reduction of sulfur dioxide to hydrogen sulfide. Further objects will be explained below.

SUMMARY OF THE INVENTION

The invention, in broad aspect, is a process for the reduction of sulfur dioxide to hydrogen sulfide in which a gaseous mixture containing sulfur dioxide and a reducing gas is contacted with a catalyst comprising a vanadium oxide supported on a carrier material.

The catalyst of the invention makes it possible to reduce sulfur dioxide in the same temperature range as used in the regeneration of metal and metal oxide acceptors. Thus, thermal efficiency is realized. Another advantage of the catalyst of the invention is that high space velocities may be used allowing the use of relatively small reactors. The catalyst is also efficient in reducing subtsantially all sulfur dioxide in the gaseous mixture, so that no unconverted sulfur dioxide reacts with the hydrogen sulfide produced to form elemental sulfur during the reduction step of the process. It has also been found that water and carbon dioxide, if present in the gaseous mixture, do not deactivate the catalyst, a disadvantage of some proposed systems. Furthermore, the catalyst shows very good stability allowing extended use without catalyst replacement.

The process of the invention may be carried out with any vanadium oxide or mixtures of vanadium oxides. The preferred vanadium oxides are vanadium pentoxide and/or vanadium trioxide.

Catalysts having a vanadium content below 1% have some catalytic effect, but it is preferred that catalyst vanadium content be in the range of from 1 to 20%, calculated on carrier material. A vanadium content higher than 20% may be used, but high vanadium contents do not result in significant additional advantage. The catalyst activity is highest if the catalyst contains from about 5 to 20% vanadium.

Free hydrogen or free hydrogen-containing gases such as gas mixtures formed by partial combustion of carbon- and hydrogen-containing material may be used as reducing gas in the process. In an advantageous embodiment of the invention a hydrocarbon is used as the hydrogen-containing reducing gas. Gases containing hydrocarbons are easily available, for instance, in petroleum refineries and as natural gas. In view of the fact that methane is often the main constituent of such gases, methane is the preferred hydrocarbon, but ethane, propane and butane and unsaturated hydrocarbons may also be used.

Three important variables in the process of the invention are (1) the ratio between the partial pressures of the reducing compound and the sulfur dioxide in the gaseous mixture to be contacted with the catalyst (2) the space velocity of the gaseous mixture and (3) the temperature at which the reduction takes place.

The ratio between the partial pressures of the reducing gas and the sulfur dioxide in the gaseous mixture to be contacted with the catalyst is preferably less than 20. Generally no additional advantages are obtained at higher space velocities. The minimum value of the ratio is, of course, determined by the ratio which is stoichiometrically required for complete reduction.

The process of the invention may be carried out over a wide range of space velocities. The reduction of sulfur dioxide is suitably effected at a space velocity between 100 and 2000 volumes of the gaseous mixture per volume of catalyst per hour. Space velocities lower than 100 and higher than 2000 may also be used, but space velocities below 100 in general do not lead to additional advantages. The reduction is preferably carried out at a space velocity between 500 and 1500 volumes of the gaseous mixture per volume of catalyst per hour, so that a reactor of comparatively small size is sufficient.

An important temperature is the minimum temperature, which is the temperature below which no complete reduction of sulfur dioxide takes place at a given set of other process variables. This minimum temperature is decreased if the ratio between the partial pressures of the reducing gas to the sulfur dioxide is increased, other process conditions being the same. At constant minimum temperature, a higher ratio allows a higher space velocity.

The process of the invention may be carried out over a wide temperature range and suitably at temperatures of from 300 to 600° C. Temperatures below 300° C. may be used, but require a high ratio between the partial pressures of the reducing gas and the sulfur dioxide and/or a very low space velocity. Carrying out the reduction at temperatures above 600° C. is possible but not required, since the reaction is sufficiently fast and complete at lower temperatures. Complete reduction of the sulfur dioxide may be obtained in a temperature range of from 350 to 450° C.

The minimum temperature also depends on the type of reducing compound, the minimum temperature being directly proportional to the hydrocarbon molecular weight. A proper choice of the reducing compound, e.g. butane, and of the process variables makes it possible to carry out the reduction in the lower part of the desired temperature range.

Suitable carrier materials are solids which are resistant to high temperatures and which are not attacked by the compounds of the gaseous mixtures to be contacted with the catalyst. Examples of suitable carrier materials are natural clays (whether or not pretreated with acid), bauxite, synthetic alumina, silica, silica-alumina and/or silica-magnesia. Alumina, in particular $\gamma$-alumina, is a very suitable carrier material.

Catalysts having a specific surface area of the carrier material below 100 m.$^2$/gram can be used; however, it is desirable that the carrier material have a relatively large specific surface area, preferably at least 100 m.$^2$/gram, to obtain high catalyst activity.

DESCRIPTION OF PREFERRED EMBODIMENTS

In one embodiment the process of the invention is used in a combined process for production of elemental sulfur from a gaseous mixture comprising sulfur dioxide. In this embodiment a sulfur-dioxide-containing gas is divided into a first stream comprising about one-third of the gas and a second stream containing about two-thirds of the gas. The second stream is combined with a third hydrogen-containing gas stream and the combined streams contacted with a catalyst comprising vanadium oxide on a carrier material. The resulting hydrogen-sulfide-rich stream is contacted with the first stream to form a feed gas for the production of elemental sulfur. Combination with a third stream is not required if the sulfur-dioxide-containing gas contains sufficient reducing gas. The elemental sulfur is then produced according to the following equation $$2H_2S + SO_2 \rightarrow 3S + 2H_2O$$

In this embodiment, fluctuations in the sulfur dioxide content of the sulfur-dioxide-containing gas do not influence the sulfur dioxide/hydrogen sulfide ratio in the feed gas for the production of elemental sulfur, since all sulfur dioxide present in the second stream will be completely reduced to hydrogen sulfide in the process of the invention.

In another advantageous embodiment of the invention the sulfur-dioxide-containing gas is obtained by contacting a solid acceptor comprising a carrier material and a metal or a metal compound with a sulfur-dioxide- and oxygen-containing gas mixture and regenerating the loaded acceptor with a reducing gas or gas mixture. The advantage of this embodiment is that the regeneration gases contains sulfur dioxide as well as unconverted reducing gas so that no, or only little, additional hydrogen-containing reducing gas has to be added to the regeneration gases to render these suitable for the process of the invention.

According to a preferred embodiment of the invention the solid acceptor comprises a carrier material containing copper oxide. As explained in the above, a copper-oxide-comprising acceptor has the advantage that the acceptance of sulfur dioxide and the regeneration of the loaded acceptor may be carried out in the same low temperature range as the reduction of sulfur dioxide according to the invention.

The catalyst used in the process of the invention may be prepared by any known technique, as for example impregnating a carrier material with an aqueous solution comprising a vanadium salt and subsequently drying and calcining the impregnated material. The carrier material may also suitably be loaded with the vanadium oxide according to a dry impregnation technique.

Sometimes gases containing sulfur dioxide also often contain a small amount of sulfur trioxide. Under the conditions at which sulfur dioxide is reduced, sulfur trioxide, if present in the gaseous reaction mixture, is also reduced to hydrogen sulfide.

The process of the invention is further illustrated in the following examples.

Example I

This example shows the influence of the carrier material and of manganese, cobalt and molybdenum on the carrier material on the sulfur dioxide reduction reaction.

Samples of a $\gamma$-alumina were respectively impregnated with an aqueous solution of manganese nitrate, cobalt nitrate and ammonium molybdate. The impregnated alumina was dried at 120° C. and then calcined for 3 hours at 500° C. The catalysts thus prepared were tested by contacting 10 ml. of the catalyst at atmospheric pressure with a gaseous mixture containing 20% v. $SO_2$ and 80% v. $CH_4$. The space velocity of the gaseous mixture was 500 standard liters per liter of catalyst per hour. The gain diameter of the catalyst was 10–35 mesh.

The activity of the catalyst is expressed as the minimum temperature in ° C. required under the applied conditions to reduce 95–100% of the $SO_2$ to $H_2S$. The results are summarized in Table I. The three types of alumina referred to in the table originate from three different manufacturers of the $\gamma$-alumina.

TABLE I

| Composition of catalyst: | Minimum temperature required for 95–100% reduction, °C. |
|---|---|
| γ-Alumina (type 1) | 590 |
| γ-Alumina (type 2) | 650 |
| γ-Alumina (type 3) | 600 |
| 5% Mn on γ-alumina (type 1) | 580 |
| 5% Mo on γ-alumina (type 1) | 570 |
| 5% Co on γ-alumina (type 1) | 575 |
| 4.6% Co/14.2% Mo on γ-alumina (type 1) | 640 |
| 5% v. on γ-alumina (type 1) | 545 |

The results show Mn, Mo and Co on type 1 of the γ-alumina exerts only a minor influence on the minimum temperature required. The combination Co/Mo has an adverse effect, the temperature of type 1 of the γ-alumina being lower than that with the Co/Mo combination.

Vanadium, on the other hand, significantly reduces the required minimum temperature.

Example II

This example shows the influence of catalyst vanadium content on the reduction of sulfur dioxide. The catalysts were prepared by impregnating γ-alumina with a solution of vanadyl oxalate followed by drying and calcining. The tests were carried out under the same conditions as those described in Example I.

TABLE II

| Composition of catalyst γ-alumina, Type 1: | Minimum temperature required for 95–100% reduction, °C. |
|---|---|
| 4% v. | 550 |
| 15% v. | 520 |
| 15% v. (beads 1.5×1.5 mm.) | 520 |
| 20% v. | 540 |

Table II shows that with 15% v. on γ-alumina the temperature required to obtain 95–100% reduction has been decreased to 520° C. This minimum temperature is not influenced by replacing the catalyst carrier with a grain diameter of 10–35 mesh by one having 1.5×1.5 mm. diameter.

Example III

This example demonstrates the influence of the partial pressure of methane on the minimum temperature required to obtain 100% reduction of $SO_2$ to $H_2S$. A catalyst consisting of 15% v. supported on γ-alumina was prepared in the same way as described in Example II. The particle size of the catalyst was 10–35 mesh. A gaseous mixture containing 20% by volume of $SO_2$ was contacted with the catalyst at atmospheric pressure and at a space velocity of 500 standard liters of gas per liter of catalyst per hour.

The results are given in Table III.

TABLE III

| Composition of gaseous mixture, percent v. | | | Minimum temperature required for complete reduction, °C. |
|---|---|---|---|
| $CH_4$ | $SO_2$ | $N_2$ | |
| 80 | 20 | 0 | 520 |
| 70 | 20 | 10 | 535 |
| 60 | 20 | 20 | 540 |
| 50 | 20 | 30 | 545 |
| 40 | 20 | 40 | 560 |
| 30 | 20 | 50 | 575 |

Table III shows that at a concentration of 20% v. $SO_2$ the minimum temperature required for complete reduction is determined by the $CH_4$ partial pressure. A higher $CH_4$ partial pressure makes it possible to use a lower minimum temperature.

Example IV

In this example the influence of the $SO_2$ partial pressure on the minimum temperature required for complete reduction at constant $CH_4$ partial pressure is shown. The conditions and the catalyst were the same as those in Example III. The results are given in Table IV below.

TABLE IV

| Composition of gaseous mixture, percent v. | | | Minimum temperature required for complete reduction, °C. |
|---|---|---|---|
| $CH_4$ | $SO_2$ | $N_2$ | |
| 5 | 70 | 25 | 440 |
| 10 | 70 | 20 | 495 |
| 20 | 70 | 10 | 535 |
| 30 | 70 | 0 | 545 |

The minimum temperature required for complete reduction of $SO_2$ was only 440° C. when the gaseous mixture contained 5% by volume of $SO_2$, 70% by volume of $CH_4$ and 25% by volume of $N_2$. Increasing the $SO_2$ partial pressure makes it necessary to increase the minimum temperature to obtain complete reduction, but is still only 545° C. at 30% v. $SO_2$.

Example V

This example illustrate the influence of the $SO_2$ partial pressure on the minimum temperature required to obtain 100% reduction of a gaseous mixture consisting entirely of $CH_4$ and $SO_2$. The conditions and the catalyst were the same as those in Examples III and IV. The results are given in Table V below.

TABLE V

| Composition of gaseous mixture, percent v. | | Minimum temperature required for complete reduction, °C. |
|---|---|---|
| $CH_4$ | $SO_2$ | |
| 95 | 5 | 415 |
| 90 | 10 | 480 |
| 80 | 20 | 520 |
| 70 | 30 | 545 |

It can be seen that with a gas containing 5% v. $SO_2$ ($CH_4/SO_2$ ratio=19) a minimum temperature of 415° C. was obtained.

Example VI

The same catalyst as used in Example III to V was used to reduce $SO_2$ with $CH_4$. The ratio between the partial pressures of $CH_4$ and $SO_2$ in the gaseous mixtures was 7.5 and the space velocity was 500. The gaseous mixture also contained $H_2O$ and $CO_2$ in quantities which may occur in a gas produced by regeneration of the copper oxide acceptor mentioned hereinbefore. The gaseous mixture contained 10% v. $H_2O$, 5% v. $CO_2$, 10% v. $SO_2$ and 75% v. $CH_4$. The high stability of the catalyst appears from the fact that the minimum temperature required for complete reduction of the $SO_2$ remained constant at 515° C. for at least 400 hours.

Example VII

The same catalyst as used in the Examples III to VI was used to reduce $SO_2$ with a mixture of 9% propene and 91% propane. The ratio between the partial pressures of propane and $SO_2$ in the gaseous mixture was 9 and the space velocity was 250. The minimum temperature required to obtain complete reduction was 295° C.

I claim as my invention:

1. A process for the reduction of sulfur oxides in a gaseous mixture to hydrogen sulfide comprising contacting a gaseous mixture comprising sulfur oxides and a hydrogen containing reducing gas with a catalyst comprising a vanadium oxide supported on a carrier, wherein the ratio of reducing gas partial pressure to sulfur dioxide partial pressure is less than about 20, the contacting effected at a space velocity of between 100 and 2000 volumes of gaseous mixture per volume of catalyst per hour and a temperature of from about 300° C. to 600° C.

2. The process of claim 1 wherein the reducing gas is a hydrocarbon.

3. The process of claim 2 wherein the carrier is γ-alumina.

4. The process of claim 3 wherein the alumina has a specific surface of at least 100 m.²/gram.

5. A process for conversion of sulfur oxides in a gaseous mixture to elemental sulfur which comprises dividing a sulfur-dioxide-containing gas into a first stream comprising about one-third of the gas and a second stream comprising about two-thirds of the gas, combining the second stream with a third stream of a hydrogen-containing reducing gas and contacting the combined stream with a catalyst comprising a vanadium oxide on a carrier material, and combining the stream after contact with the catalyst with the said first stream to form a feed gas for the production of elemental sulfur.

6. The process of claim 5 wherein the sulfur-dioxide-containing gas is obtained by contacting a solid acceptor comprising a metal or metal oxide supported on a carrier with a sulfur-dioxide- and oxygen-containing gas mixture and regenerating the acceptor with a reducing gas.

7. The process of claim 6 wherein the solid acceptor is copper oxide supported on a carrier.

8. The process of claim 6 wherein the sulfur-dioxide- and oxygen-containing gas is a flue gas resulting from the combustion of sulfur-containing carbonaceous fuels.

References Cited

UNITED STATES PATENTS

| | | | |
|---|---|---|---|
| 2,180,353 | 11/1939 | Foster | 252—456 |
| 2,631,087 | 10/1953 | Herndon | 23—226 |
| 2,747,968 | 5/1956 | Pigache | 23—178 |
| 2,887,363 | 5/1959 | Viles | 23—181 |

OSCAR R. VERTIZ, Primary Examiner

G. O. PETERS, Assistant Examiner

U.S. Cl. X.R.

23—181